United States Patent [19]

Riley et al.

[11] Patent Number: 4,475,397

[45] Date of Patent: Oct. 9, 1984

[54] METHOD AND MEANS FOR ATTAINING ULTRASONIC ATTENUATION BY VECTOR SAMPLE AVERAGING

[75] Inventors: James K. Riley, Shingle Springs, Calif.; Stephen W. Flax, Waukesha, Wis.

[73] Assignee: General Electric Company, Rancho Cordova, Calif.

[21] Appl. No.: 399,845

[22] Filed: Jul. 19, 1982

[51] Int. Cl.³ .......................................... G01N 29/04
[52] U.S. Cl. ....................................................... 73/599
[58] Field of Search ............. 73/1 DV, 631, 599, 627, 73/620, 602, 618; 128/660

[56] References Cited

U.S. PATENT DOCUMENTS

| | | | |
|---|---|---|---|
| 3,309,914 | 3/1967 | Weighart | 73/631 |
| 4,016,750 | 4/1977 | Green | 73/631 |
| 4,361,043 | 11/1982 | Engle | 128/660 |

OTHER PUBLICATIONS

"Statistical Evaluation of the Doppler Ultrasonic Blood Flowmeter", Flax et al., ISA Transactions, vol. 10, No. 1, 1971.

"Ultrasonic Attenuation Tomography of Soft Tissues", Dines et al., *Ultrasonic Imaging*, vol. 1, No. 1, 1979.

"Estimating the Acoustic Attenuation Coefficient Slope for Liver from Reflected Ultrasound Signals", Kuc et al., IEEE Transactions on Sonics and Ultrasonics, vol. SU-26, No. 5, Sep. 1979.

*Primary Examiner*—Anthony V. Ciarlante
*Attorney, Agent, or Firm*—Flehr, Hohbach, Test, Albritton & Herbert

[57] ABSTRACT

The ultrasonic wave attenuation of tissue undergoing examination is determined by directing a plurality of ultrasonic signals into the tissue, receiving and detecting a measure (e.g. zero crossings) of the frequencies of ultrasonic signals reflected from various depths in said tissue, and averaging the measures of the frequencies for each of the various depths. Attenuation of the tissue between a first depth and a second depth is determined from a comparison of the averaged measure at the first depth and the averaged measure at the second depth.

8 Claims, 6 Drawing Figures

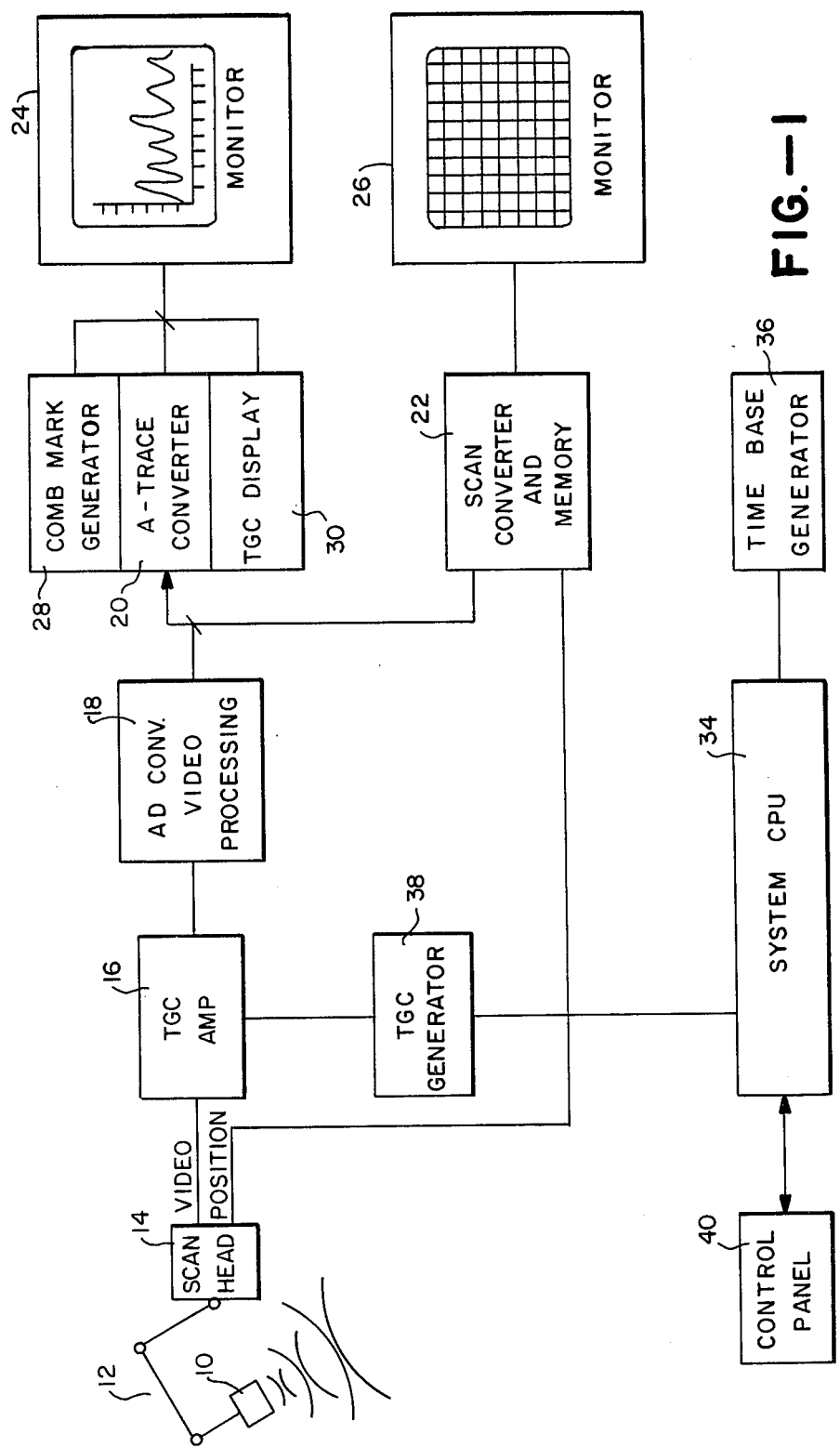
FIG.—1

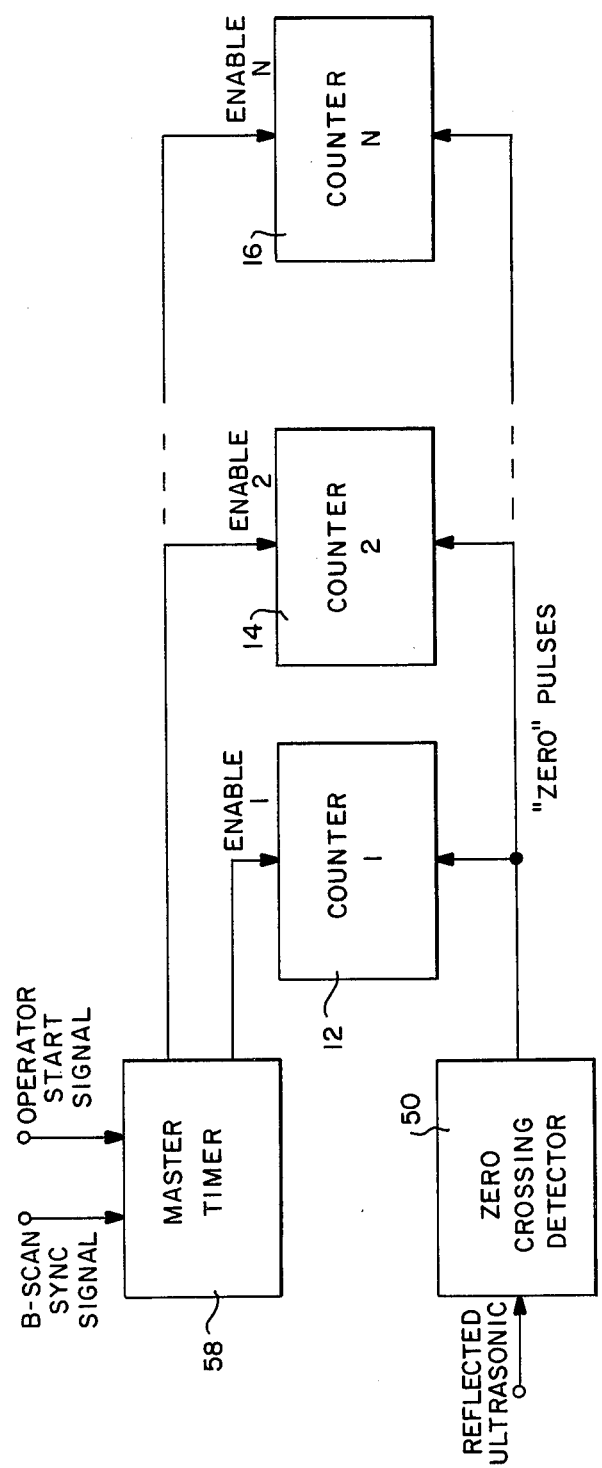
FIG.—2

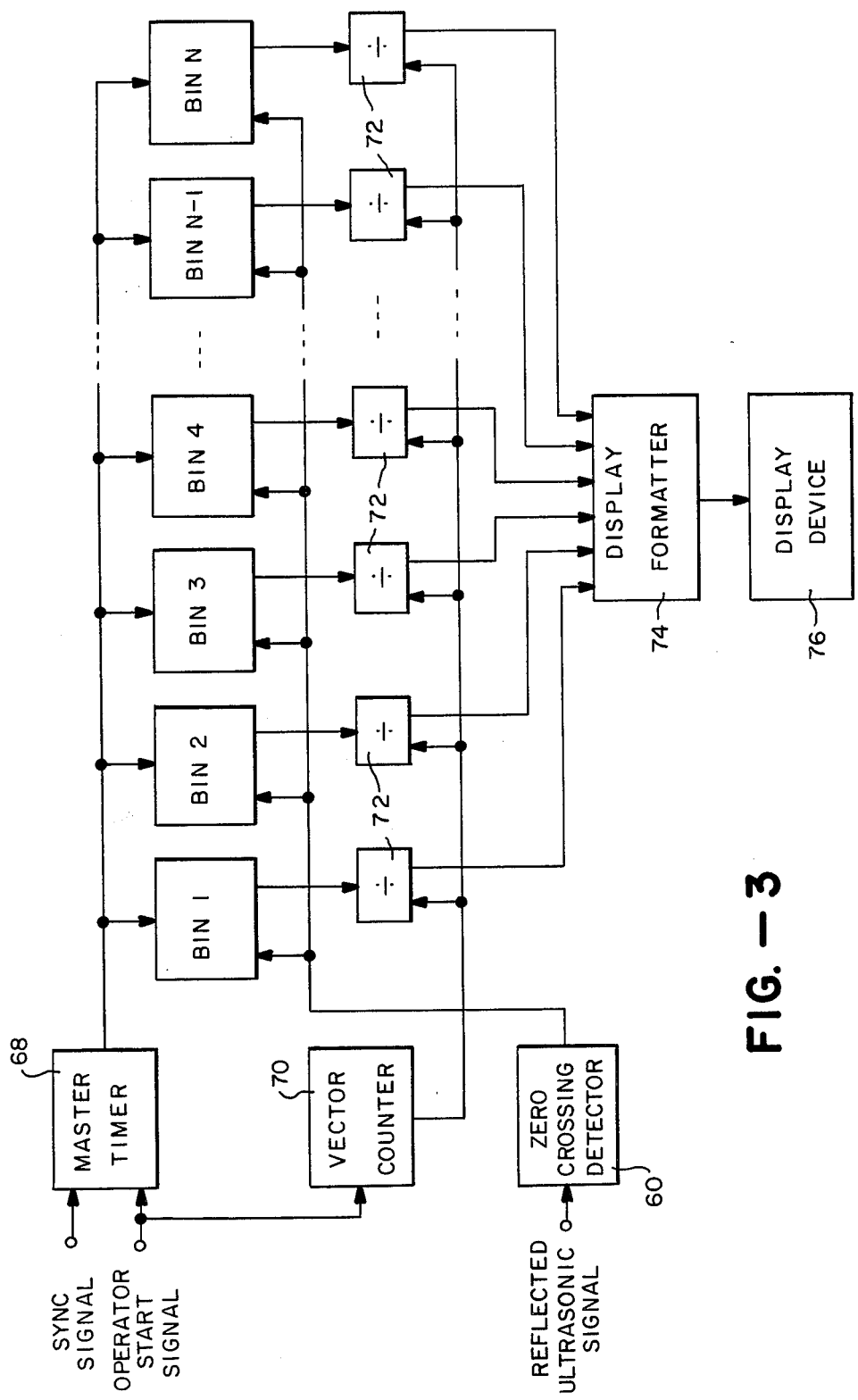

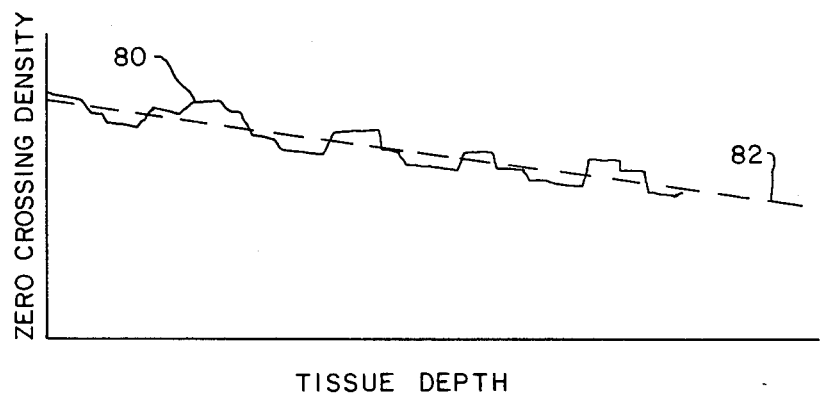
FIG.—4A
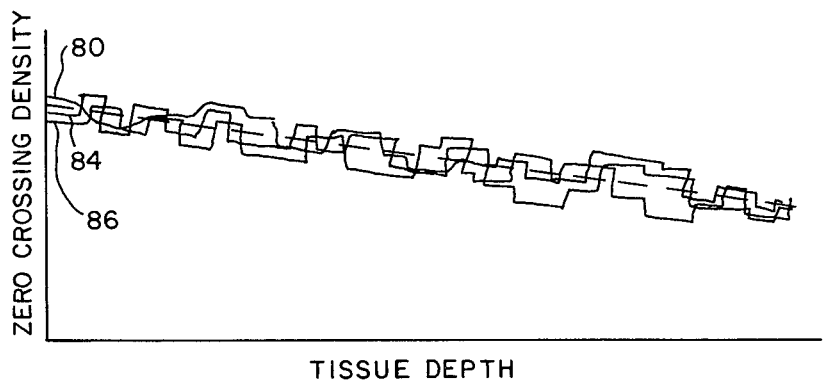
FIG.—4B
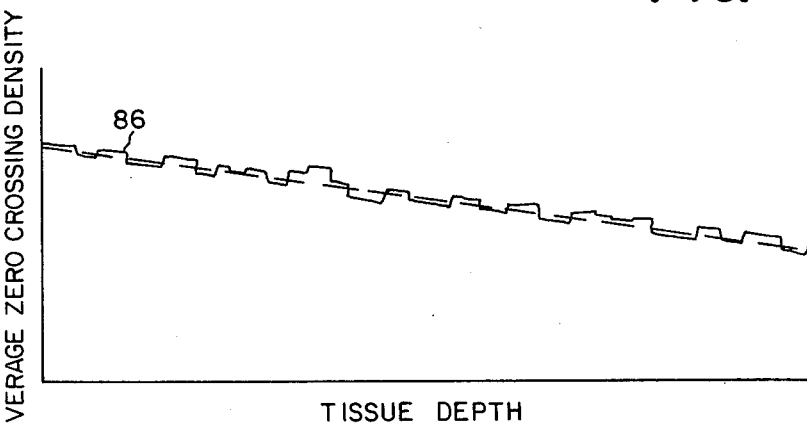
FIG.—4C

METHOD AND MEANS FOR ATTAINING ULTRASONIC ATTENUATION BY VECTOR SAMPLE AVERAGING

This invention relates to ultrasonic scanning systems as used for medical diagnostic purposes, and more particularly the invention relates to determining the ultrasonic attenuation of tissue under examination.

Ultrasonic diagnostic systems are known and commercially available for medical diagnostic purposes. See for example U.S. Pat. No. 4,172,386 "Video A Trace Display System for Ultrasonic Diagnostic System" and U.S. Pat. No. 4,204,433 for "Computerized Ultrasonic Scanner With Technique Select". The commercially available Datason ultrasound system of General Electric Company provides both real time and static images on a television display.

Briefly, such systems utilize sound transducers to transmit ultrasonic (e.g. on the order of several megahertz) waves into a patient and to receive reflected signals. The echo signals are applied to a time gain compensated amplifier to adjust the echo signals for attenuation in passing through the patient. The adjusted signals are then passed through an analog to digital conversion and video processing circuitry and thence to scan converter circuitry for display format.

Disclosed in co-pending patent application Ser. No. 369,423 now U.S. Pat. No. 4,441,368 filed Apr. 19, 1982 for Method and Means for Determining Ultrasonic Wave Attenuation in Tissue, is a method of determing frequency dependent attenuation at differing levels in tissue using a time domain analysis rather than a frequency domain analysis. More particularly, by counting the zero crossings of a reflected ultrasonic signal for different levels in tissue under examination and then comparing the zero crossing density at one level to the zero crossing density at a second level, the attenuation of the tissue between the two levels can be ascertained. The method and apparatus for determining zero crossing density is relatively simple and reliable.

The use of zero crossing density to derive an attenuation value produces an estimate thereof since any single measure of zero crossing density for a finite sample interval will necessarily have a variance associated therewith. Normally, the variance of a sample can be reduced by increasing the sample interval such as described by Flax et al in "Statistical Evaluation of the Doppler Ultrasonic Blood Flow Meter", ISA Transactions, Vol. 10, No. 1.

However, the zero crossing density of a reflected ultrasonic wave is not a constant but actually decreases with depth due to attenuation. Thus, a statistical improvement can be obtained only by averaging the zero crossing density from several independent vectors through the tissue being quantified.

Accordingly, an object of the present invention is a method of improving the accuracy of ultrasonic attenuation of tissue derived from detected frequencies of a reflected ultrasonic signal.

Another object of the invention is apparatus for accumulating a measure of frequency such as zero crossing density data and providing an average value thereof.

A feature of the invention is the use of a plurality of ultrasonic signal vectors for obtaining a measure of attenuation versus depth in tissue under examination.

The invention and objects and features thereof will be more readily apparent from the following detailed description and appended claims when taken with the drawing, in which:

FIG. 1 is a functional block diagram of an ultrasonic scanning system.

FIG. 2 is a functional block diagram of apparatus useful in establishing ultrasonic attenuation in tissue under analysis.

FIG. 3 is a functional block diagram of apparatus in accordance with the invention for obtaining averaged values of zero crossing densities as a function of tissue depth.

FIGS. 4A-4C are curves of zero crossing densities versus tissue depth illustrating the method in accordance with the invention.

Referring now to the drawings, FIG. 1 is a functional block diagram of an ultrasonic scanner. In this embodiment the system includes a transducer 10 mounted on a hinged arm system shown generally at 12 whereby transducer 10 can move freely in a single plane. Potentiometers in scanhead 14 and associated with the arms of the system generate signals indicative of the X and Y position of the scanner 10 in the plane of motion.

Transducer 10 transmits ultrasonic signals (e.g. on the order of 2 megahertz) and generates electrical signals in response to reflections of the transmitted ultrasonic signals. The generated signals are attenuated in time due to attenuation of the ultrasonic signal in passing through a patient.

The attenuated video signal is then applied to a variable gain amplifier 16, and the amplified signal is then applied to analog to digital conversion and video processing circuitry 18. The output of circuitry 18 is then applied to A trace converter circuitry 20 and to scan converter and memory circuitry 22 which generate the signals for controlling television monitors 24 and 26, respectively.

The A trace converter generates a signal for real time display of the amplitude of each reflected ultrasonic wave. The A trace data applied to monitor 24 identifies a horizontal position on the monitor (e.g. 512 positions) and an amplitude or vertical position associated with each X position. This data controls the intensity of the electron beam in the display during raster line scanning by the beam. Scale markings for the displayed A trace are generated by comb mark generator 28, and a time gain compensation curve is provided by generator 30.

A section view of the patient is displayed on monitor 26 in response to the scan converter and memory 22. The signal from circuitry 18 is converted for storage in a 512×512 memory matrix with each point in the matrix accommodating a 5 bit brightness code. The matrix corresponds to the pixels on the display of monitor 26 with the brightness code being indicative of the Grayscale for the pixels.

System control is provided by a central processing unit 34 which also controls a time base generator 36 which generates the timing signals for the system. A time gain compensation (TGC) control generator 38 generates the control signals for amplifier 16 and a control panel 40 is provided for manual control of the system through the central processing unit.

FIG. 2 is a functional block diagram of apparatus as disclosed in copending application Ser. No. 369,370, supra, in which a reflected ultrasonic signal from tissue under examination is applied to a zero crossing detector 50. The detector 50 preferably comprises a monostable multivibrator which is triggered by a Schmitt trigger whereby a pulse is generated in response to each zero crossing of the reflected signal. Such a Schmitt trigger and monostable multivibrator is commercially available, for example the Texas Instruments 74221 integrated circuit device. The output of the detector 10 is a series of pulses which are then connected to a plurality of counters such as counter 1, counter 2, ... counter N. In a preferred embodiment each counter is a conventional pulse counter. Alternatively, each counter can comprise capacitive means for storing charge in response to the pulses.

A master timer 52 controls each of the counters whereby a count is accumulated for a specific interval of time corresponding to a depth in the tissue under examination. The master timer receives an operator start signal and a sync signal from the ultrasonic scanner, and enable signals are then generated for each of the counters based on the time of flight of an ultrasonic wave in the tissue under examination and the depth of the tissue from which zero crossings for reflected signals are to be counted.

By comparing the count at one level to the count at another level an estimate of the frequency dependent attenuation of an acoustic wave therebetween is established. By so establishing the attenuation throughout the tissue under examination a more accurate time gain control signal is established for the time gain compensated amplifier in the ultrasonic scanning apparatus.

As above described, the use of zero crossing density to derive an attenuation value produces only an estimate thereof since any single measure of zero crossing density based on a finite sample interval will necessarily have a variance associated therewith. In accordance with the invention a statistical improvement is obtained by averaging the zero crossing densities for samples from several independent vectors through the tissue being quantitied.

FIG. 3 is a functional block diagram of apparatus in accordance with the invention for obtaining the averaged value of zero crossing densities as a function of tissue depth.

The circuitry is similar to the circuitry of FIG. 2 with the reflected ultrasonic signal being applied to a zero crossing detector 60 with the count of the zero crossing vector being accumulated in bins 1, 2, 3 ... N-1 and N as indicated. However, a plurality of signal vectors are generated with each vector applying a sync signal to the master timer 68. The number of vectors is counted by a vector counter 70, and the count of counter 70 controls a plurality of dividers 72 which receive the accumulated count from each of the bins and derives an average value by dividing the accumulated count by the number of vectors. The averaged value from each of the bins is then applied to a display formatter 74 for controlling a display device such as a video display 76.

Thus, an operator of the system can make a visual judgment as to how reliable the measurements are by viewing the display to determine how quickly the data converges to an acceptable value.

The convergence of the data, as viewed on the display, is further illustrated in FIGS. 4A-4C which are curves of the zero cross densities versus tissue depth showing the convergence of the data. In FIG. 4A the measured zero crossing density for a single vector is plotted as the curve 80. The theoretical value of the decreasing zero crossing densities with tissue depth is illustrated by the dotted line 82. It is thus seen that the measured value has a number of incremental variances associated therewith. FIG. 4B is a composite of three vectors including vector 80, vector 84, and vector 86. Each of the vectors generates a count with the total count accumulated in the bins 1 ... N of FIG. 3. FIG. 4C is the averaged value of the three vectors plotted as curve 88 and it will be noted that the incremental variances of curve 88 are significantly reduced from the incremental variances of the individual vector curves 80, 84, and 86. As the number of vectors increases, a more accurate measure of the actual zero crossing curve is thus obtained.

While the invention has been described with reference to a specific embodiment, the description is illustrative of the invention and is not to be construed as limiting the invention.

Various modifications and applications may occur to those skilled in the art without departing from the true spirit and scope of the invention as defined by the appended claims.

What is claimed is:

1. A method of determining ultrasonic wave attenuation of tissue comprising the steps of
    transmitting a plurality of ultrasonic waves into said tissue along a plurality of vectors,
    receiving reflected ultrasonic waves from the tissue,
    detecting and counting zero crossings of said reflected ultrasonic waves as reflected from various depths in said tissue,
    averaging said zero crossings from said reflected waves reflected from the same depths in said tissue along said vectors, and
    determining tissue attenuation from the averaged zero crossings from said vectors.

2. The method as defined by claim 1 wherein said step of determining tissue attenuation includes comparing the averaged zero crossing density at a first depth to the averaged zero crossing density at a second depth to determine the ultrasonic attenuation between said first depth and said second depth.

3. An ultrasonic scanning system for determining ultrasonic wave attenuation in tissue under examination comprising
    transducer means for transmitting ultrasonic waves into said tissue,
    detector means for receiving reflected ultrasonic waves and identifying a repetitive feature of said reflected waves,
    counting means for counting said repetitive feature of ultrasonic waves reflected from various depths in said tissue and obtaining an average thereof, and
    display means for displaying an image controlled by the averaged frequencies at said various depths.

4. The apparatus as defined by claim 2 wherein said means for identifying a repetitive feature comprises a zero crossing detector.

5. The apparatus as defined by claim 3 wherein said counting means comprises a plurality of memory bins for accumulating measures of said detected frequencies, each memory bin corresponding to a depth in said tissue, and divider means for dividing the accumulated measures in said memory bins by the number of transmitted ultrasonic waves.

6. For use in an ultrasonic scanning system for determining ultrasonic wave attenuation in tissue under examination, apparatus comprising
    detector means for receiving reflected ultrasonic waves and identifying a repetitive feature of said reflected waves, and counting means for counting said repetitive feature of ultrasonic waves reflected from various depths in said tissue and obtaining an average thereof.

7. Apparatus as defined by claim 6 wherein said means for identifying a repetitive feature comprises a zero crossing detector.

8. Apparatus as defined by claim 6 or 7 wherein said counting means comprises a plurality of memory bins for accumulating measures of said detected frequencies, each memory bin corresponding to a depth in said tissue, and divider means for dividing the accumulated measures in said memory bins by the number of transmitted ultrasonic waves.

* * * * *

UNITED STATES PATENT AND TRADEMARK OFFICE
CERTIFICATE OF CORRECTION

PATENT NO. : 4,475,397
DATED : October 9, 1984
INVENTOR(S) : James K. Riley
Stephen W. Flax It is certified that error appears in the above—identified patent and that said Letters Patent is hereby corrected as shown below:

Col. 1, line 31, "determing" should be --determining--

Col. 4, line 53, change "2" to --3--.

Signed and Sealed this

Ninth Day of July 1985

[SEAL]

Attest:

DONALD J. QUIGG

Attesting Officer   Acting Commissioner of Patents and Trademarks